US006963368B1

(12) United States Patent
Shibazaki

(10) Patent No.: US 6,963,368 B1
(45) Date of Patent: Nov. 8, 2005

(54) DIGITAL CAMERA AND IMAGE CAPTURING CONTROL APPARATUS INCLUDING A DELAY DEVICE

(75) Inventor: Kiyoshige Shibazaki, Higashimurayama (JP)

(73) Assignee: Nikon Corporation, Tokyo (JP)

( * ) Notice: Subject to any disclaimer, the term of this patent is extended or adjusted under 35 U.S.C. 154(b) by 1068 days.

(21) Appl. No.: 09/637,607

(22) Filed: Aug. 15, 2000

(30) Foreign Application Priority Data

Aug. 16, 1999 (JP) .................................. 11-229815

(51) Int. Cl.$^7$ ......................................... H04N 5/217
(52) U.S. Cl. ..................................... 348/241; 348/244
(58) Field of Search .................... 348/241, 295, 348/312, 244, 372, 243, 294, 311; 713/401, 713/500, 400

(56) References Cited

U.S. PATENT DOCUMENTS

| | | | | |
|---|---|---|---|---|
| 4,803,562 A | * | 2/1989 | Eino ............................. | 348/76 |
| 5,210,777 A | * | 5/1993 | Narabu et al. ................. | 377/60 |
| 5,696,553 A | * | 12/1997 | D'Alfonso et al. ..... | 348/211.14 |
| 5,875,042 A | * | 2/1999 | Kashitani et al. ........... | 358/474 |
| 6,005,408 A | * | 12/1999 | Gillette ....................... | 324/765 |
| 6,271,880 B1 | * | 8/2001 | Kameshima et al. ........ | 348/244 |
| 6,329,758 B1 | * | 12/2001 | Salam ...................... | 315/169.2 |
| 6,347,191 B1 | * | 2/2002 | Kurosu ..................... | 396/221 |
| 6,426,804 B1 | * | 7/2002 | Kanno et al. ............... | 358/445 |
| 2003/0142219 A1 | * | 7/2003 | McGarvey et al. ...... | 348/222.1 |

FOREIGN PATENT DOCUMENTS

JP     A-8-317298     11/1996     .......... H04N 5/335

* cited by examiner

*Primary Examiner*—Wendy R. Garber
*Assistant Examiner*—Nelson D. Hernandez
(74) *Attorney, Agent, or Firm*—Oliff & Berridge, PLC

(57) ABSTRACT

A digital camera includes: an image-capturing device that captures a subject image through a taking lens; a signal processing circuit that performs predetermined processing such as noise removal on an image-capturing signal output by the image-capturing device; a drive circuit that enables the image-capturing device to operate; a delay device that outputs a signal achieved by applying a predetermined delay to a drive signal used to drive the image-capturing device and the signal processing circuit; and a control device that sets a delay time for the delay device.

7 Claims, 11 Drawing Sheets

FIG. 8

| CONTROL BIT | DELAY QUANTITY |
|---|---|
| [0000] | 0nsec |
| [0001] | 1nsec |
| [0010] | 2nsec |
| [0011] | 3nsec |
| [0100] | 4nsec |
| [0101] | 5nsec |
| [0110] | 6nsec |
| [0111] | 7nsec |
| [1000] | 8nsec |
| [1001] | 9nsec |
| [1010] | 10nsec |
| [1011] | 11nsec |
| [1100] | 12nsec |
| [1101] | 13nsec |
| [1110] | 14nsec |
| [1111] | 15nsec |

FIG. 10

| DRIVE SIGNAL | DETECTED TEMPERATURE | | |
|---|---|---|---|
| | LESS THAN +10°C | *1 | +30°C OR HIGHER |
| φH1 | [0010] | [0100] | [0111] |
| φH2 | [0010] | [0100] | [0111] |
| φRG | [0010] | [0011] | [0100] |
| SHP | [0001] | [0010] | [0011] |
| SHD | [0100] | [0101] | [0110] |

*1 +10~ LESS THAN +30°C

FIG. 11

| DRIVE SIGNAL | DETECTED VOLTAGE | | |
|---|---|---|---|
| | V1 OR HIGHER | V2~ LESS THAN V1 | LESS THAN V2 |
| φH1 | [0011] | [0100] | [0101] |
| φH2 | [0011] | [0100] | [0101] |
| φRG | [0001] | [0010] | [0011] |
| SHP | [0001] | [0010] | [0011] |
| SHD | [0100] | [0101] | [0110] |

FIG. 12

| DRIVE SIGNAL | NUMBER OF PHOTOS | | |
|---|---|---|---|
| | FEWER THAN 10,000 | *2 | 100,000 OR MORE |
| φH1 | [0001] | [0100] | [0101] |
| φH2 | [0001] | [0100] | [0101] |
| φRG | [0001] | [0010] | [0011] |
| SHP | [0001] | [0010] | [0011] |
| SHD | [0100] | [0101] | [0110] |

*2 10,000 ~ FEWER THAN 100,000

DIGITAL CAMERA AND IMAGE CAPTURING CONTROL APPARATUS INCLUDING A DELAY DEVICE

IN CORPORATION BY REFERENCE

The disclosure of to the following priority application is herein incorporated by reference: Japanese Patent Application No. 11-229815 filed Aug. 16, 1999.

BACKGROUND OF THE INVENTION

1. Field of the Invention

The present invention relates to a digital camera and an image-capturing control apparatus that employ an image-capturing device such as a CCD to capture an image of a subject.

2. Description of the Related Art

Digital cameras in the known art include those provided with an image-capturing device such as a CCD that outputs image data by capturing a subject image passing through a taking lens and an image signal processing circuit that removes noise from image signals output by the image-capturing device by utilizing a correlated double sampling (CDS) circuit or the like.

In such a digital camera in the prior art, the operating timing of the sampling circuit that performs sampling in conformance to the timing with which image signals are output by the image-capturing device, the operating timing of the clamp circuit that samples image signals during black level periods in conformance to the above timing in order to set the black level of the image signals at a specific value and the operating timing of the A/D conversion circuit that converts the analog image signals having been sampled by the circuits mentioned above to digital image signals are adjusted so as to match with one another.

When a component used in any of the circuits is changed, it may be necessary to modify the operating timing in correspondence to the new particulars of the component. In addition, any changes in the temperature during an operation of an electronic component used in any of the circuits or changes in the voltage applied to the electronic component usually cause changes in its operating timing. Thus, if the digital camera is operated under operating conditions in which the temperature changes greatly or if the voltage at a circuit becomes lowered due to depletion of the battery in the digital camera, the operating timing of the circuit may change. This poses a serious problem particularly when the digital camera is a high image quality digital camera with a large number of pixels provided at the image-capturing device, in which image signals resulting from an image-capturing operation are sampled at high speed or when the digital camera is used continuously over a long period of time.

SUMMARY OF THE INVENTION

An object of the present invention is to provide a digital camera and an image-capturing control apparatus that enable adjustment of the operating timing of a drive signal that drives an image-capturing device and the operating timing of a drive signal that drives a signal processing circuit that processes image-capturing signals.

In order to attain the above object, a digital camera according to the present invention comprises: an image-capturing device that captures a subject image through a taking lens; a signal processing circuit that performs predetermined processing such as noise removal on an image-capturing signal output by the image-capturing device; a drive circuit that enables the image-capturing device to operate; a delay device that outputs a signal achieved by applying a predetermined delay to a drive signal used to drive the image-capturing device and the signal processing circuit; and a control device that sets a delay time for the delay device.

In this digital camera, it is preferred that the control device sets the delay time for the delay device for each photographing operation.

It is preferred that the above digital cameras further comprises a temperature detection device that detects a temperature at, at least, one of the image-capturing device, the signal processing circuit and the drive circuit, and the control device sets the delay time for the delay device in correspondence to the temperature detected by the temperature detection device.

Also, it is preferred that the above digital cameras further comprises a voltage detection device that detects a source voltage supplied to the image-capturing device, the signal processing circuit and the drive circuit, and the control device sets the delay time for the delay device in correspondence to the voltage detected by the voltage detection device.

Also, in the above digital cameras, it is preferred that the signal processing circuit includes a correlated double sampling circuit (CDS).

An image-capturing control apparatus according to the present invention, comprises: a signal processing device that performs predetermined processing such as noise removal on an image-capturing signal obtained through photoelectric conversion performed at an image-capturing device and output by the image-capturing device; a drive signal generating device that generates a drive signal used to drive the image-capturing device and the signal processing device; a delay device that delays the drive signal in conformance to a delay control signal; and a control device that outputs the delay control signal to the delay device so as to adjust operating timing of the drive signal to a predetermined operating timing.

In this image-capturing control apparatus, it is preferred that the control device detects an environment condition that disrupts the predetermined operating timing and outputs the delay control signal in correspondence to the detected environment condition. In this case, it is preferred that the environment condition is an environment condition changed by a temperature that affects timing with which the image-capturing signal is output. Or, it is preferred that the environment condition is an environment condition changed by a voltage that affects the timing with which the image-capturing signal is output.

BRIEF DESCRIPTION OF THE DRAWINGS

FIG. 8 presents a table showing an example of a corresponding relationship between the control bits for setting the delay quantity and the delay quantity;

FIG. 10 presents a table showing an example of corresponding relationships between the detected temperature and the control bits for the individual drive signals;

FIG. 11 presents a table showing an example of corresponding relationships between the detected voltage and the control bits for the individual drive signals; and FIG. 12 presents a table showing an example of corresponding relationships between the total number of photos taken and the control bits for the individual drive signals.

DESCRIPTION OF THE PREFERRED EMBODIMENTS

Figure 1A:
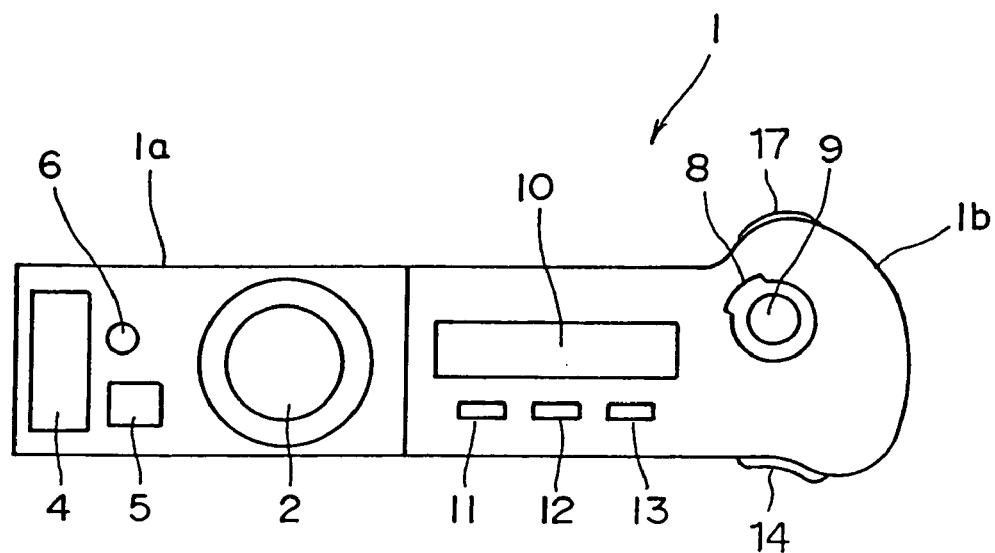
FIG. 1A presents an external appearance of the digital still camera in a storage state and in a carrying state, viewed from above.
Figure 1B:
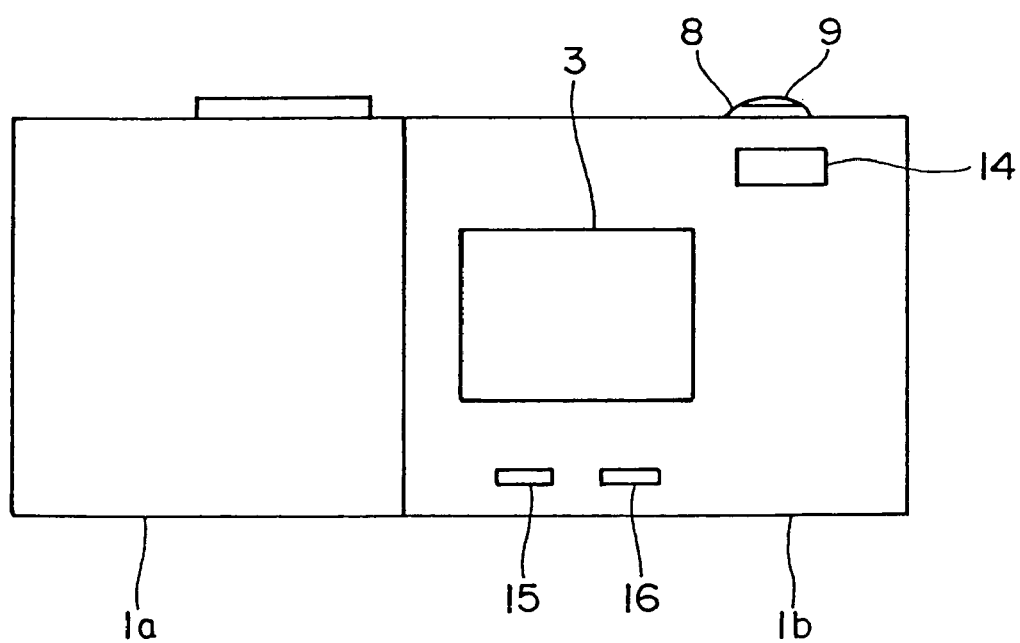
FIG. 1B presents an external appearance of the digital still camera in a storage state and in a carrying state, viewed from the rear.
Figure 2A:
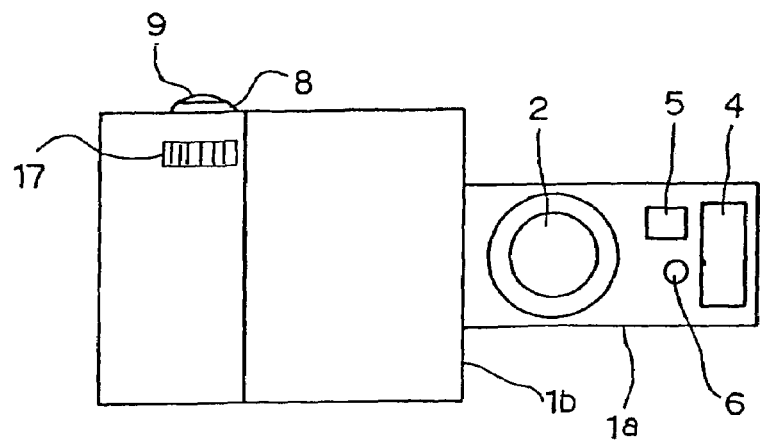
FIG. 2A presents an external view of the camera in FIG. 1 during a normal photographing operation, viewed from the front.
Figure 2B:
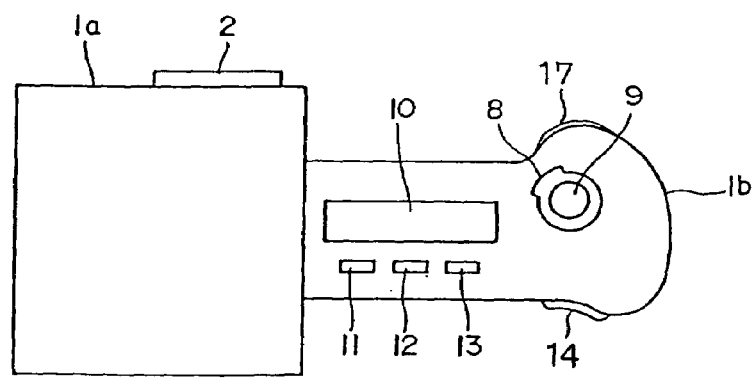
FIG. 2B presents an external view of the camera in FIG. 1 during a normal photographing operation, viewed from above.
Figure 2C:
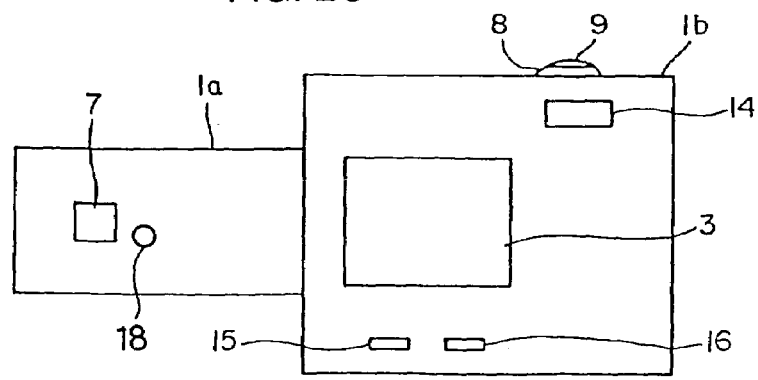
FIG. 2C presents an external view of the camera in FIG. 1 during a normal photographing operation, viewed from the rear.

The following is an explanation of the preferred embodiments of the present invention, given in reference to the drawings. FIGS. 1A and 1B present an external appearance of the digital still camera in the first embodiment of the present invention in a storage state and in a carrying state, with FIG. 1A presenting at top view and FIG. 1B presenting a rear view. In addition, FIGS. 2A~2C present external views of the camera in FIGS. 1A and 1B during a normal photographing operation, with FIG. 2A presenting a front view, FIG. 2B presenting a top view and FIG. 2C presenting a rear view. The digital still camera 1 in this embodiment comprises a lens unit 1a, which includes a taking zoom lens 2, and a monitor unit 1b, which includes an LCD monitor 3, with the two units 1a and 1b divided from each other and linked with each other so that they can rotate relative to each other.

When the digital still camera is in a storage or in a carrying state, the lens unit 1a is rotated so as to place the lens unit 1a and the monitor unit 1b flush with each other, as illustrated in FIG. 1. When performing a normal photographing operation, the lens unit 1a is rotated so as to turn the taking zoom lens 2 toward the subject, as illustrated in FIG. 2. Since the monitor unit 1b is held in such a manner that the LCD monitor 3 is turned toward the photographer at this time, the photographer is able to take photographs while looking into the LCD monitor 3.

The lens unit 1a is provided with an electronic flash unit 4, a viewfinder window 5, a red-eye reduction self timer indicator lamp 6, a viewfinder eyepiece window 7 and the like in addition to the taking zoom lens 2. The monitor unit 1b is provided with a main switch 8, a shutter release button 9, a display panel 10, a flash photographing mode button 11, an AF mode button 12, an image quality mode button 13, a zoom switch button 14, a monitor button 15, a menu button 16, a selector dial 17 and the like in addition to the LCD monitor 3.

Figure 3:
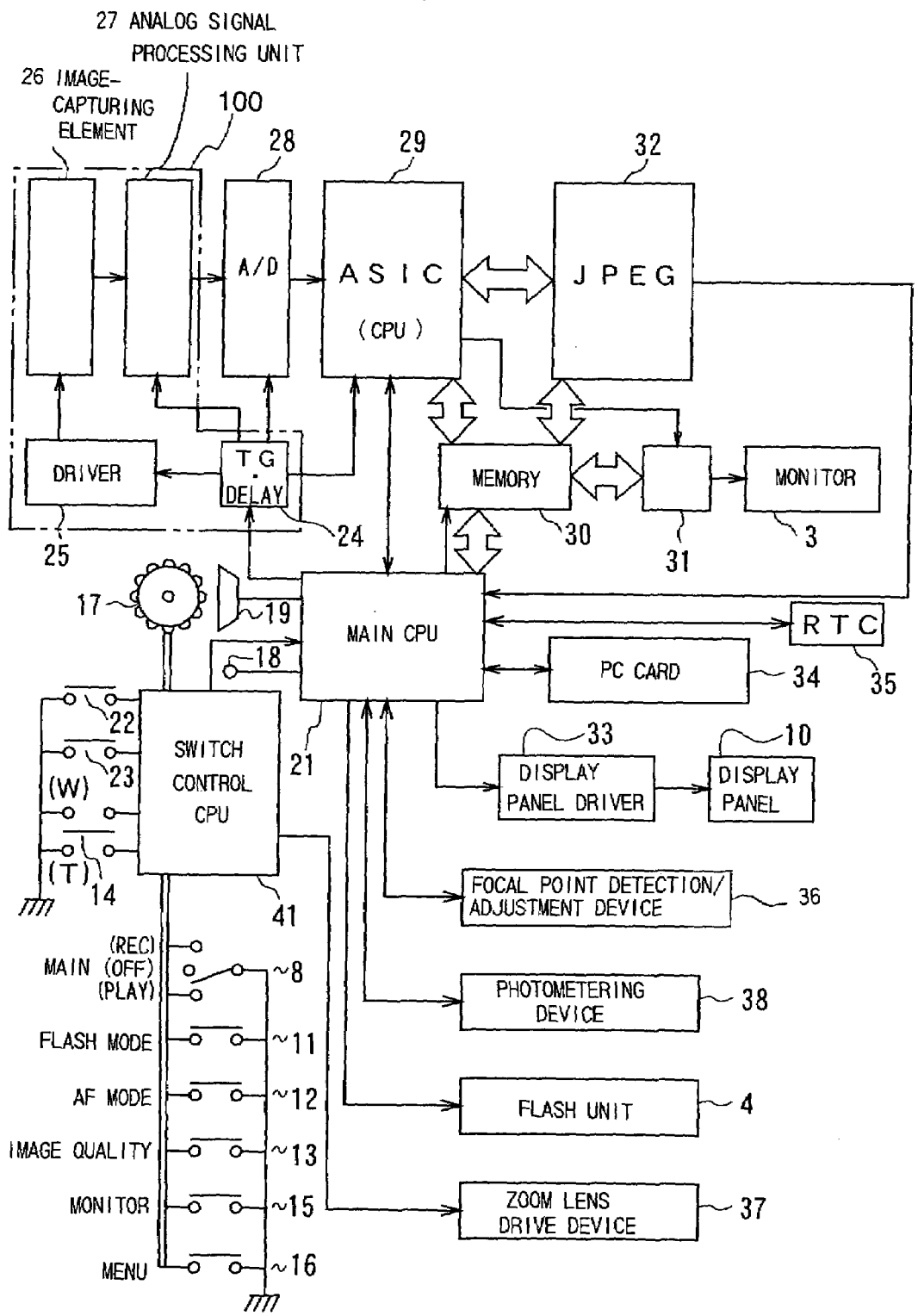
FIG. 3 is a circuit block diagram of the digital still camera in the embodiment.

FIG. 3 is a circuit block diagram of the digital still camera 1 in this embodiment. The digital still camera 1 is provided with an image-capturing unit 100 that includes an image-capturing element 26, an analog signal processing circuit 27 that processes analog signals output by the image-capturing element 26, a driver 25 that controls drive of the image-capturing element 26 and a timing control circuit 24 that controls the operating timing of the image-capturing element 26 and the operating timing of the analog signal processing circuit 27. The digital still camera 1 is controlled by a main CPU 21 that controls focal point detection/adjustment processing, photometering processing and the like, an image processing CPU 29 that controls image processing and image display processing and a switch control CPU 41 that controls signals input through various switches. The switch control CPU 41 transmits information input by operating any of the various switches at the digital still camera 1 to the main CPU 21, and it drives the taking zoom lens 2 by implementing control on a zoom lens drive device 37 when the zoom switch button 14 is operated.

Either a photographing mode (REC) or a reproduction mode (PLAY) is set for the digital still camera 1 through a switching operation performed at the main switch 8. The main switch 8 is switched to one of, at least, three positions, i.e., OFF, REC and PLAY. The photographing mode is an operating mode in which a captured subject image is recorded as image data, whereas the reproduction mode is an operating mode in which the recorded image data are read out and displayed on the LCD monitor 3. In either of the two operating modes, the camera may be set in a menu setting mode for selecting/setting a camera operation. Since the present invention is characterized by a photographing operation performed in the photographing mode, the photographing mode is now explained.

When the main switch 8 is switched to the photographing mode (REC) position, power is turned on at the digital still camera 1 and the digital still camera 1 is set in the photographing mode. A halfway press signal and a full press signal are input respectively from a halfway press switch 22 and a full press switch 23 (hereafter referred to as the shutter release switch 23), that interlock with the shutter release button 9 to the switch control CPU 41. If the halfway press switch 22 is operated and a halfway press signal is input, the switch control CPU 41 sends information indicating that a halfway press signal has been input to the main CPU 21, and in response to a command issued by the main CPU 21, a focal point detection/adjustment device 36 detects the focal adjustment state of the taking zoom lens 2. Then, the taking zoom lens 2 is driven to the focus matched position so that subject light entering the taking zoom lens 2 forms an image on the image-capturing element 26 constituting an image-capturing device.

When the zoom switch button 14 is operated, a zoom lens drive device 37 drives the taking zoom lens 2 in response to a command issued by the switch control CPU 41 to change the focal length. The zoom button 14 is constituted of a seesaw type switch, and the focal length is changed either toward the telephoto side (T) or the wide angle side (W) that is being pressed. A photometering device 38 measures the brightness of the subject, and engages in a photometering operation when a halfway press signal is input through the halfway press switch 22, which interlocks with the shutter release button 9, to the main CPU 21 via the switch control CPU 41.

If the shutter release switch 23 is turned on after the halfway press switch 22 is set to an on state, the flash unit 4 emits light in correspondence to the results of the photometering operation performed by the photometering device 38 and the mode set in advance through the flash photographing mode button 11, and with the subject light from the taking zoom lens 2 forming an image on the light-receiving surface of the image-capturing element 26, a signal charge corresponding to the brightness of the subject image is stored at the image-capturing element 26. Timing control for the image-capturing element 26 is implemented by the timing control circuit 24 via the driver 25, and the signal charge stored at the image-capturing element 26 is cleared out in response to a drive signal output by the driver 25 to be input to the analog signal processing circuit 27, which includes a noise removal circuit and a DC reproduction circuit to be detailed later. The analog image signal having undergone analog processing such as noise removal and gain control at the analog signal processing circuit 27 is then converted to a digital signal at the A/D conversion circuit 28. The timing control circuit 24 implements timing control on the analog signal processing circuit 27 and the A/D conversion circuit 28 as well.

The digitized signal is guided to the image processing CPU 29 where it undergoes image prepossessing such as outline compensation and gamma correction. It is then temporarily stored in a buffer memory 30. The main CPU 21 and the buffer memory 30 engage in image data exchange, a white balance adjustment value is ascertained based upon the stored image data, a white balance adjustment is performed at the image processing CPU 29 based upon the adjustment value and the image data having undergone the white balance adjustment are stored in the buffer memory 30 again.

The image data stored in the buffer memory 30 are processed at a display image generating circuit 31 which is controlled by the image processing CPU 29 and, thus, display image data are created. These display image data are displayed at the LCD monitor 3 as a photographic image plane referred to as a freeze image plane.

The image data having undergone the image preprocessing described above further undergo format processing (image post-processing) for JPEG compression at the image processing CPU 29, the data are compressed at a specific rate through the JPEG method by a compression circuit 32 which is controlled by the image processing CPU 29 and the compressed data assigned with a specific data name by the main CPU 21 are recorded in a recording medium (a PC Card, a CF card or the like) 34 such as a flash memory together with time information provided from a real-time clock 35.

In addition, a display panel driver 33 is connected to the main CPU 21, and the statuses of the light emission mode setting at the flash unit 4 set through the flash photographing mode button 11, the distance range set through the AF mode button 12 and the compression rate set through the image quality mode button 13 are displayed at the display panel 10.

Image-Capturing Unit

Figure 4:
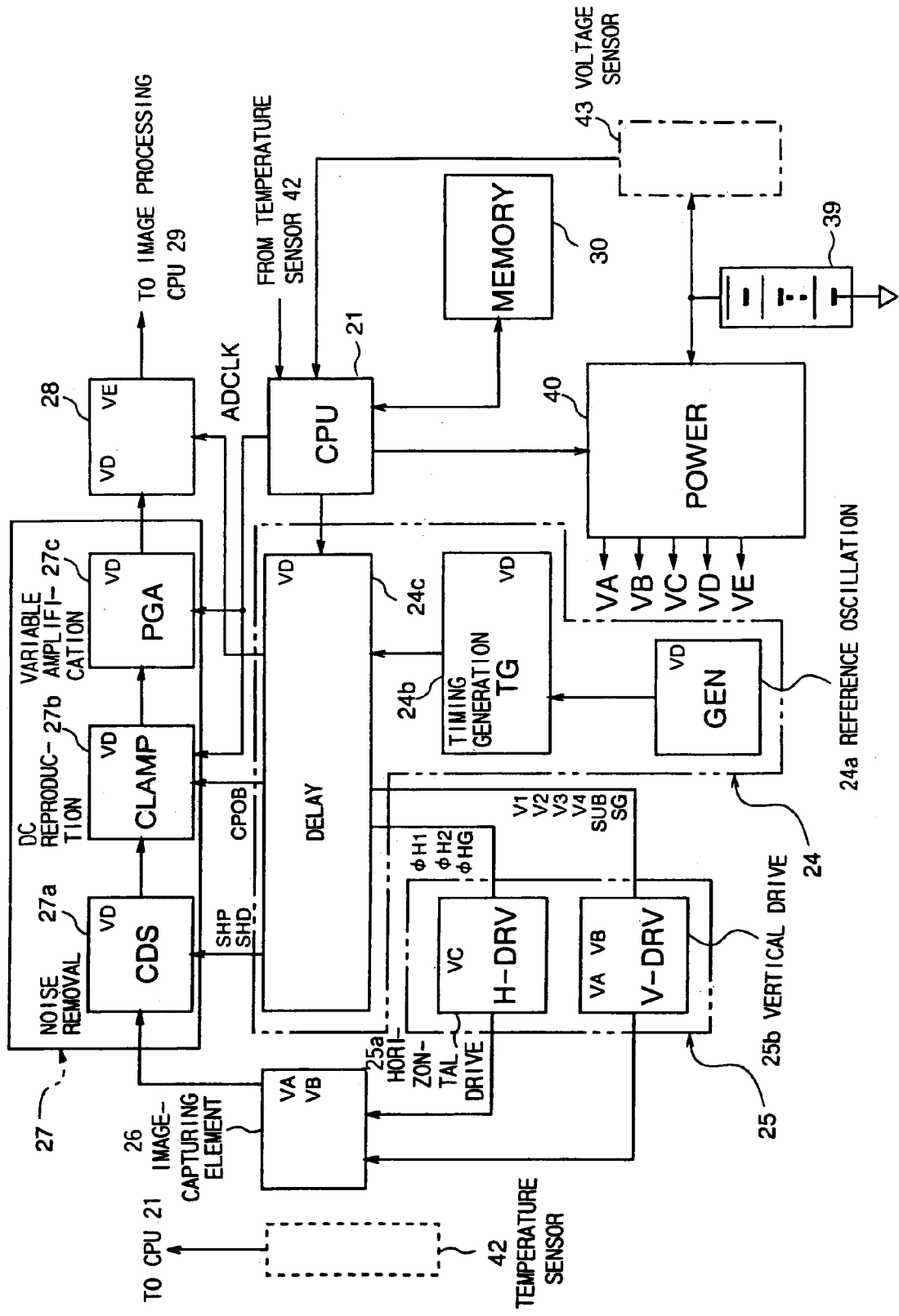
FIG. 4 is a block diagram of the circuits in the image-capturing unit.

FIG. 4 is a block diagram illustrating in detail the structure of the image-capturing unit 100 in the digital camera which operates as described above. In FIG. 4, a power circuit 40 connected to a battery 39 converts a source voltage input from the battery 39 to specific voltage levels and supplies output voltages VA, VB, VC, VD and VE to various circuit blocks. In the individual circuit blocks in FIG. 4, the specific types of output voltages VA, VB, VC, VD and VE that they receive are described. The power circuit 40 is connected to a control terminal of the main CPU 21 and, in response to a control signal provided by the main CPU 21 through the control terminal, it turns on/off the outputs of the output voltages VA, VB, VC, VD and VE. It is to be noted that a specific level of source voltage is applied to the main CPU 21 at all times as long as the main switch 8 is set to either the photographing mode (REC) or the reproduction mode (PLAY).

The timing control circuit 24 (see FIG. 3) comprises a reference oscillation circuit 24a, a timing generating circuit 24b and a delay circuit 24c. The analog signal processing circuit 27 comprises a noise removal circuit 27a, a DC reproduction circuit 27b and a variable amplifier circuit 27c, and the driver 25 for the image-capturing element 26 comprises a horizontal drive circuit 25a and a vertical drive circuit 25c. Source voltages VA~VD from the power circuit 40 are connected to the circuits 24, 25 and 27. The reference oscillation circuit 24a outputs a reference clock signal constituted of the oscillation output from a quartz oscillator and the timing generating circuit 24b generates horizontal drive signals ØH1, ØH2 and ØRG for the image-capturing element 26 and vertical drive signals V1, V2, V3, V4, SUB and SG for the image-capturing element 26 through dividing the frequency of the reference clock signal and logic synthesis. In addition, the timing generating circuit 24b generates drive signals SHP and SHD for the noise removal circuit 27a, a drive signal CPOB for the DC reproduction circuit 27b and a drive signal ADCLK for the A/D conversion circuit 28 as well. The various drive signals output by the timing generating circuit 24b are input to the delay circuit 24c.

When a halfway press signal is input through an operation of the halfway press switch 22 (see FIG. 3) in the image-capturing unit 100 shown in FIG. 4, a detection of the focal adjustment state and a photometering operation start in response to an instruction from the main CPU 21. In addition, with the shutter release switch 23 set to an on state, the power circuit 40 is turned on to supply the source voltage is VA, VB, VC, VD and VE to the circuits in the image-capturing unit 100 such as the image-capturing element 26. Following the power supply start, the reference oscillation circuit 24a outputs a reference clock signal and the timing generating circuit 24b generates the horizontal drive signal ØH1, ØH2 and ØRG for the image-capturing element 26 and the vertical drive signals V1, V2, V3, V4, SUB and SG for the image-capturing element 26.

The individual drive signals ØH1, ØH2 ØRG, V1, V2, V3, V4, SUB, SG, SHP, SHD, CPOB and ADCLK output by the timing generating circuit 24b are input to the delay circuit 24c independently of one another, and each drive signal is delayed at the delay circuit 24c. The quantity of delay effected by the delay circuit 24c is determined in conformance to information on the delay quantity transmitted through the control terminal of the main CPU 21, and this delay quantity information is transmitted from the main CPU 21 to the delay circuit 24c each time the shutter release switch 23 is operated, i.e., for each photographing operation.

The transmission of the delay quantity information from the main CPU 21 to the delay circuit 24c is achieved through serial communication. Information on the delay quantity for each of the various drive signals is sequentially transmitted from the main CPU 21, and the delay quantity information received at the delay circuit 24c is stored at a register in the delay circuit 24c. The delay quantity information with regard to the individual drive signals thus stored is held in the register until the shutter release switch 23 is operated again and new delay quantity information is transmitted.

The delay circuit 24c sets a delay quantity for the circuit based upon the delay quantity information transmitted from the CPU 21 through an operation of the shutter release switch 23, and horizontal drive signals and vertical drive signals delayed by the delay quantity thus set are respectively output to the horizontal drive circuit 25a and the vertical drive circuit 25b. The horizontal drive circuit 25a outputs a signal achieved by converting the amplitude and the output impedance of the horizontal drive signal output by the delay circuit 24c to specific values required by the image-capturing element 26, whereas the vertical drive circuit 25b outputs a signal achieved by converting the amplitude and the output impedance of a vertical drive signal output by the delay circuit 24c to specific values required by the image-capturing element 26.

The image-capturing element 26 stores an electrical charge in correspondence to the brightness of the light irradiated on its image-capturing surface, and the electrical charge thus stored is read out by a drive signal for the image-capturing element 26 and is output as an image signal. The signal thus output is input to the noise removal circuit 27a which is to be detailed later, so that unnecessary signal components such as reset noise are removed. The noise removal circuit 27a samples/holds the image signal output by the image-capturing element 26 by using pulses of the drive signals SHP and SHD to output only the effective signal component. As explained earlier, the degrees to which the drive signals SHP and SHD are delayed are adjusted at the delay circuit 24c based upon the delay quantity information provided by the CPU 21. The noise removal circuit 27a functions to its full capability when the drive signals SHP and SHD are adjusted to accurately match the timing of image signal output by the image-capturing element 26.

An output signal from the noise removal circuit 27a is input to the DC reproduction circuit 27b. The DC reproduction circuit 27b engages in an operation to set a pixel signal which optically achieves a black reference, i.e., an image signal output from a light-blocked pixel, among image signals output from the image-capturing element 26 to a specific voltage. The specific voltage value set by the DC reproduction circuit 27b is provided from the main CPU 21 through the control terminal. This information on the voltage setting is transmitted each time the shutter release switch 23 is operated, i.e., for each photographing operation, from the main CPU 21 to the DC reproduction circuit 27b, as is the delay quantity information described earlier. In addition, the degree to which the drive signal CPOB for the DC reproduction circuit 27b is delayed is also adjusted at the delay circuit 24c based upon the delay quantity information provided by the CPU 21.

An output signal from the DC reproduction circuit 27b is input to the variable amplifier circuit 27c. The variable amplifier circuit 27c amplifies the input image signal at a specific amplification factor in correspondence to the amplification factor information transmitted from the main CPU 21 and outputs the amplified signal to the A/D conversion circuit 28. The amplification factor at which the signal is amplified at the variable amplifier circuit 27c is provided by the main CPU 21 through the control terminal. The amplification factor information is transmitted from the main CPU 21 to the variable amplifier circuit 27c each time the shutter release switch 23 is operated, i.e., for each photographing operation, as are the delay quantity information and the voltage setting information.

The image signal input to the A/D conversion circuit 28, which is an analog signal, is converted to a digital signal with the timing with which the drive signal ADCLK is output by the delay circuit 24c and the digital image signal resulting from the conversion is output to the image processing CPU 29 (see FIG. 3). The timing with which the A/D conversion circuit 28 performs the conversion changes in correspondence to the degree by which the drive signal ADCLK is delayed at the delay circuit 24c, and this delay quantity is adjusted in correspondence to delay quantity information transmitted from the main CPU 21 to the delay circuit 24c through the control terminal. The delay quantity information is transmitted from the main CPU 21 to the delay circuit 24c each time the shutter release switch 23 is operated, i.e., for each photographing operation. The digital image signal output from the A/D conversion circuit 28 to the image processing CPU 29 (see FIG. 3) undergoes a series of image processing such as the null grid point interpolation processing, white balance processing and gamma correction processing.

Noise Removal

Figure 5:
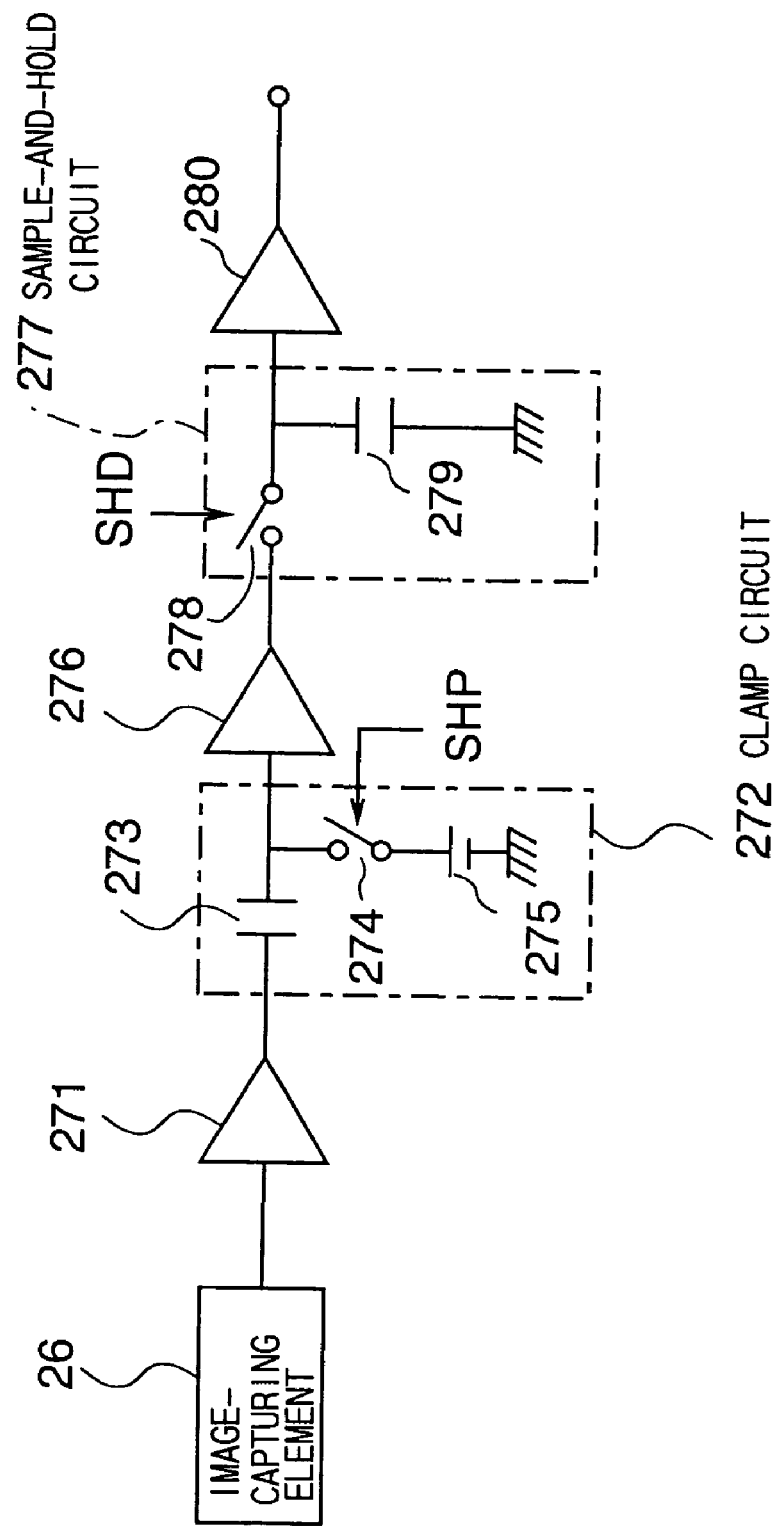
FIG. 5 shows the structure of the CDS circuit.

The noise removal circuit 27a mentioned earlier is explained in further detail. A signal output by a solid image-capturing element such as a CCD normally contains low frequency noise such as image-capturing element reset noise and amplifier noise. Accordingly, noise reduction processing is implemented by utilizing a correlated double sampling (CDS) circuit. FIG. 5 illustrates the CDS circuit 27a. In FIG. 5, a charge stored at and read out from the image-capturing element 26 is input to a clamp circuit 272 via a buffer amplifier 271 as an image signal. The clamp circuit 272 outputs the signal received from the buffer amplifier 271 via a coupling capacitor 273, and also by applying a voltage supplied by a DC source 275 to the output side of the coupling capacitor 273 through a switch 274 with a clamp pulse SHP, it clamps the image signal output by the coupling capacitor 273 at a field-through level and removes reset noise, amplifier noise and the like.

The image signal output from the clamp circuit 272 is input to a sample-and-hold circuit 277 via a buffer amplifier 276. By driving a switch 278 with a sampling pulse SHD, the sample-and-hold circuit 277 samples the image signal output from the buffer amplifier 276 and holds it at a holding capacitor 279. The image signal thus held is output via a buffer amplifier 280.

Figure 6:
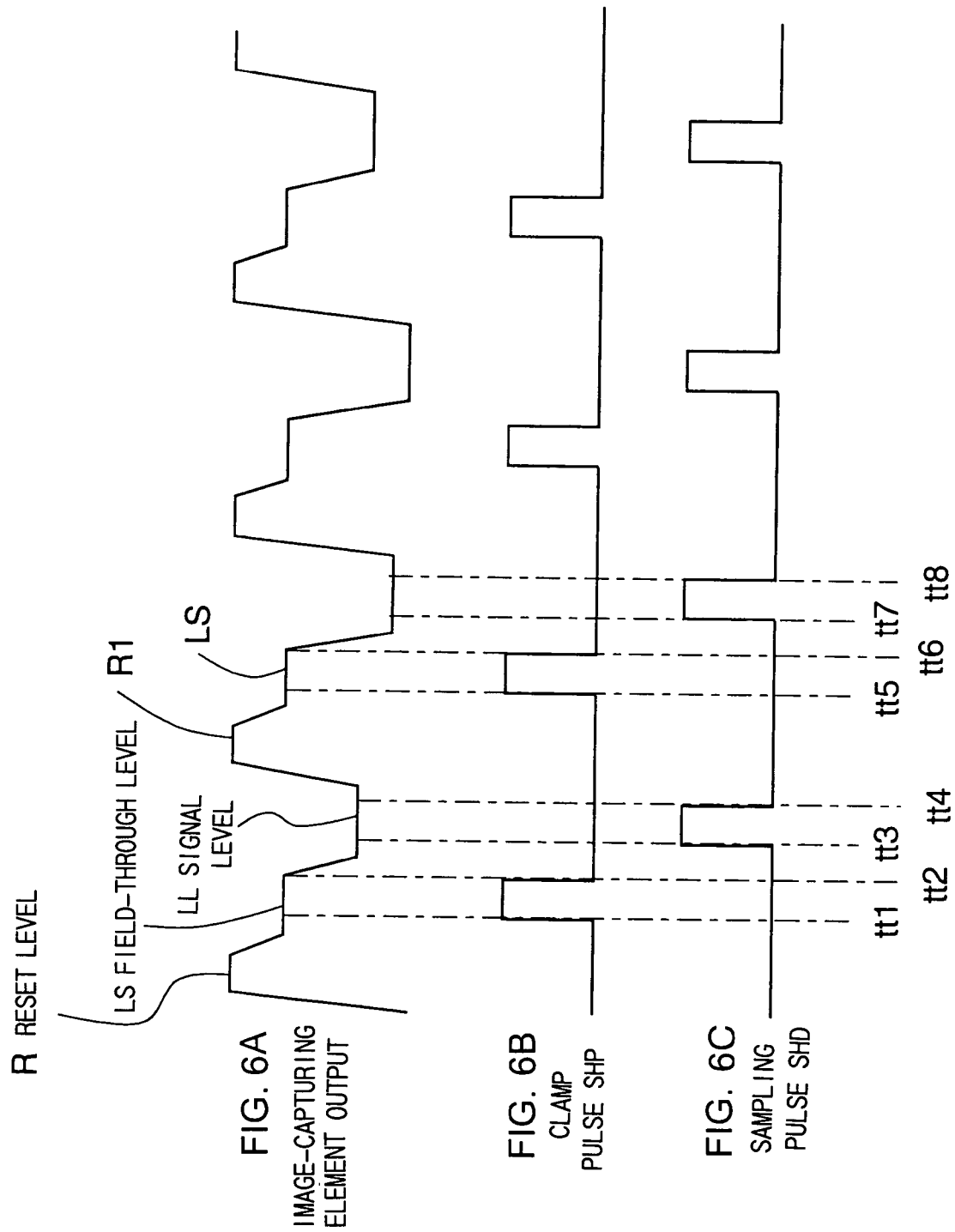
FIGS. 6A~6C are timing charts of the operation performed in the CDS circuit.

The operation of the CDS circuit described above is now explained in reference to the timing charts in FIGS. 6A~6C. The output signal from the image-capturing element 26 in FIG. 6A is an image signal output via the buffer amplifier 271 (see FIG. 5) achieved by sequentially transferring charge signals resulting from the photoelectric conversions performed at photoelectric conversion elements constituting the individual pixels at the image-capturing element 26. The charge quantity of the output signal from the image-capturing element 26 increases when the image-capturing element 26 is reset at each pixel unit and the output signal becomes stabilized at a reset level R. When the clamp pulse SHP in FIG. 6B is applied between a timing tt1 and a timing tt2 after the reset, the output signal from the image-capturing element 26 is clamped at the level of the voltage supplied from the DC source 275, i.e., at the field-through level LS, and is adjusted to a reference level achieved by removing noise. Then, when the output signal shifts from the field-through level LS to a signal level LL, the signal level LL is sampled with the sampling pulse SHD in FIG. 6C between a timing tt3 and a timing tt4 and the signal level LL that has been held is output as an image signal. Namely, the signal level LL as opposed to the field-through level LS is output.

Timing Adjustment

As indicated in FIGS. 6A~6C, the timing with which the output signal is output from the image-capturing element 26 relative to the timing of the clamp pulse SHP and the sampling pulse SHD must be optimized. Under normal circumstances, a phase delay occurs between a signal input to the circuit and a signal output from the circuit due to a propagation delay in the circuit. Since the image-capturing element 26 is driven by the various drive signals output by the horizontal drive circuit 25a and the vertical drive circuit 25b in FIG. 4, phase delays that are dependent upon the delay characteristics of the two drive circuits occur in the individual drive signals. In addition, when the drive signals manifesting the phase delays are input to the image-capturing element 26, a delay also occurs in the timing with which the image signal is output from the image-capturing element 26. Thus, in order to achieve the optimal drive timing for the image-capturing element 26, the noise removal circuit 27a, the DC reproduction circuit 27b and the A/D conversion circuit 28 that digitizes image signals, an adjustment is performed to match the timing of the individual waveforms achieved in the circuits above in reference to the horizontal and vertical drive signal waveforms of the drive signals for the image-capturing element 26 at the input terminal. The adjustment of these delay quantities is performed at the delay circuit 24c in conformance to the delay quantity information transmitted from the main CPU 21 to the delay circuit 24c as described earlier.

Figure 7:
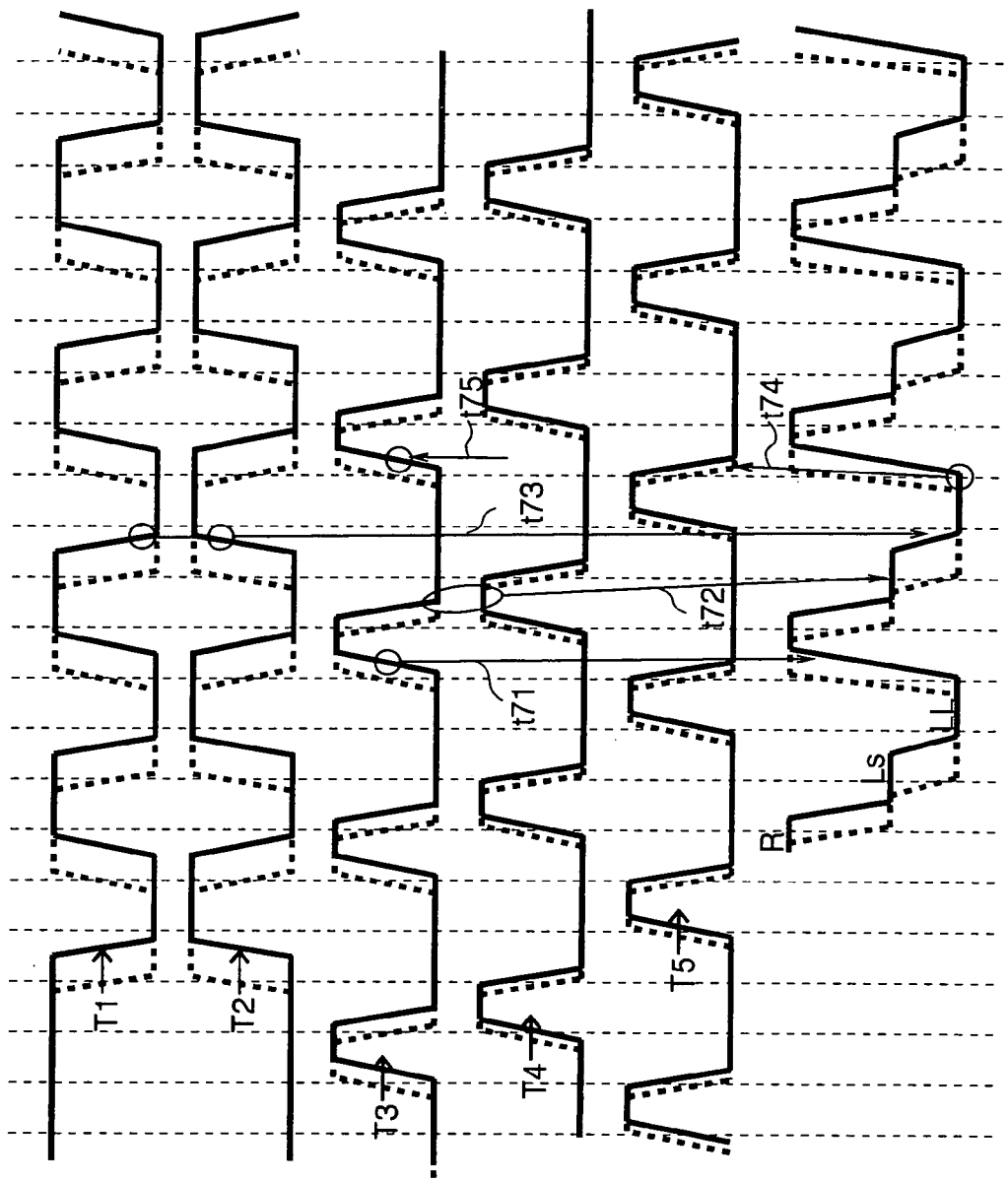
FIGS. 7A~7F are timing charts of the operation performed in the image-capturing unit in the first embodiment.

FIGS. 7A~7F illustrate signal waveforms of the horizontal drive signals ØH1, ØH2 and ØRG required for the drive of the image-capturing element 26, the drive signals SHP and SHD required for sampling the image signal output from the image-capturing element 26 with the horizontal drive signal at the noise removal circuit 27a and the image signal output by the image-capturing element 26 (image-capturing element output). In the signal waveforms in FIGS. 7A~7F, the solid lines indicate timing waveforms achieved by adjusting the delay quantities to optimal values and dotted lines indicate pre-adjustment timing waveforms. First, the individual waveforms presented in the solid lines are explained. The drive signal ØH1 in FIG. 7A and the drive signal ØH2 in FIG. 7B are used to output an image signal from the image-capturing element 26, and when ØH1 falls and ØH2 rises, the output from the image-capturing element 26 is set to the signal level LL, as shown in FIG. 7F. The drive signal ØRG in FIG. 7C resets the output signal from the image-capturing element 26.

The drive signal SHP in FIG. 7D is a clamp pulse for the noise removal circuit 27a and is equivalent to SHP in FIGS. 6A~6C. The clamp pulse SHP adjusts the output signal from the image-capturing element 26 to a specific field-through level LS. The drive signal SHD in FIG. 7E is a sampling pulse for the noise removal circuit 27a and corresponds to SHD in FIGS. 6A~6C. With the sampling pulse SHD, the output signal from the image-capturing element 26 is sampled and held.

The details given above are now explained with reference to the operating sequence. When the drive signal ØRG which resets the output signal from the image-capturing element 26 rises, an output signal reset operation is performed (t71). When the clamp pulse SHP rises and the drive signal ØRG falls, the output signal from the image-capturing element 26 is fixed at the field-through level LS (t72). As the drive signal ØH1 falls and the drive signal ØH2 rises after a fall of the clamp pulse SHP, the output from the image-capturing element 26 is set to the signal level LL (t73). After the signal level LL is output at the output from the image capturing element 26, when the sampling pulse SHD rises and falls the signal level LL is sampled (t74). The drive signal ØRG rises again and a reset operation is performed to reset the output signal from the image-capturing element 26 (t75). The operation described above is repeatedly performed for the individual pixels.

If the timing of the clamp pulse SHP and the sampling pulse SHD relative to the timing with which the image signal is output from the image-capturing element 26 is not optimized, the main CPU 21 reads out adjustment value data, i.e., delay quantity information, stored in advance at the register in the main CPU 21, and transmits the delay quantity information to the delay circuit 24c for each photographing operation. The signal waveforms achieved when the delay quantity information provided by the main CPU 21 is at 0 represent waveforms with a minimum delay quantity setting, i.e., the pre-timing adjustment waveforms indicated with the dotted lines in FIGS. 7A~7F. By setting independent delay quantities for the individual drive signals at the delay circuit 24c, the timing represented by the solid line waveforms, which is optimal for the operation of the image-capturing element 26, the noise removal circuit 27a and the A/D conversion circuit 28, is set. If the minimum unit of setting is 1 nsec and delay quantities are to be selected with a 4-bit control signal (referred to as control bits), for instance, 16 different delay quantities (0000)~(1111) can be set. FIG. 8 presents a table that shows an example of the correspondence between the control bits and the delay quantity setting.

With T1, T2, T3, T4 and T5 respectively representing delay quantities required for the drive signal ØH1, the drive signal ØH2, the drive signal ØRG, the clamp pulse SHP and the sampling pulse SHD in order to achieve optimal timing for each waveform, the main CPU 21 transmits a signal string achieved by serially setting the control bits corresponding to the delay quantities T1~T5 to the delay circuit to 24c and the delay circuit 24c stores the signal thus received in its internal register to achieve signal-string based delay quantity setting. If T1=3 nsec, T3= 2 nsec, T4=1 nsec and T5=1 nsec, for instance, a signal string;

| T1 | T2 | T3 | T4 | T5 |
|------|------|------|------|------|
| [0011] | [0011] | [0010] | [0001] | [0001] | is transmitted to the delay circuit 24c. Optimal delay quantities are set in advance during the assembly/adjustment of the image-capturing unit 100 and are stored in the register inside the main CPU 21.

In order to achieve the delays corresponding to the signal-string based delay quantities described above, a digital delay line is utilized. A digital delay line outputs a signal achieved by applying a specific delay to a signal input to the delay line in correspondence to the particulars of the setting at a digital input terminal at which the delay quantity is set.

Figure 9:
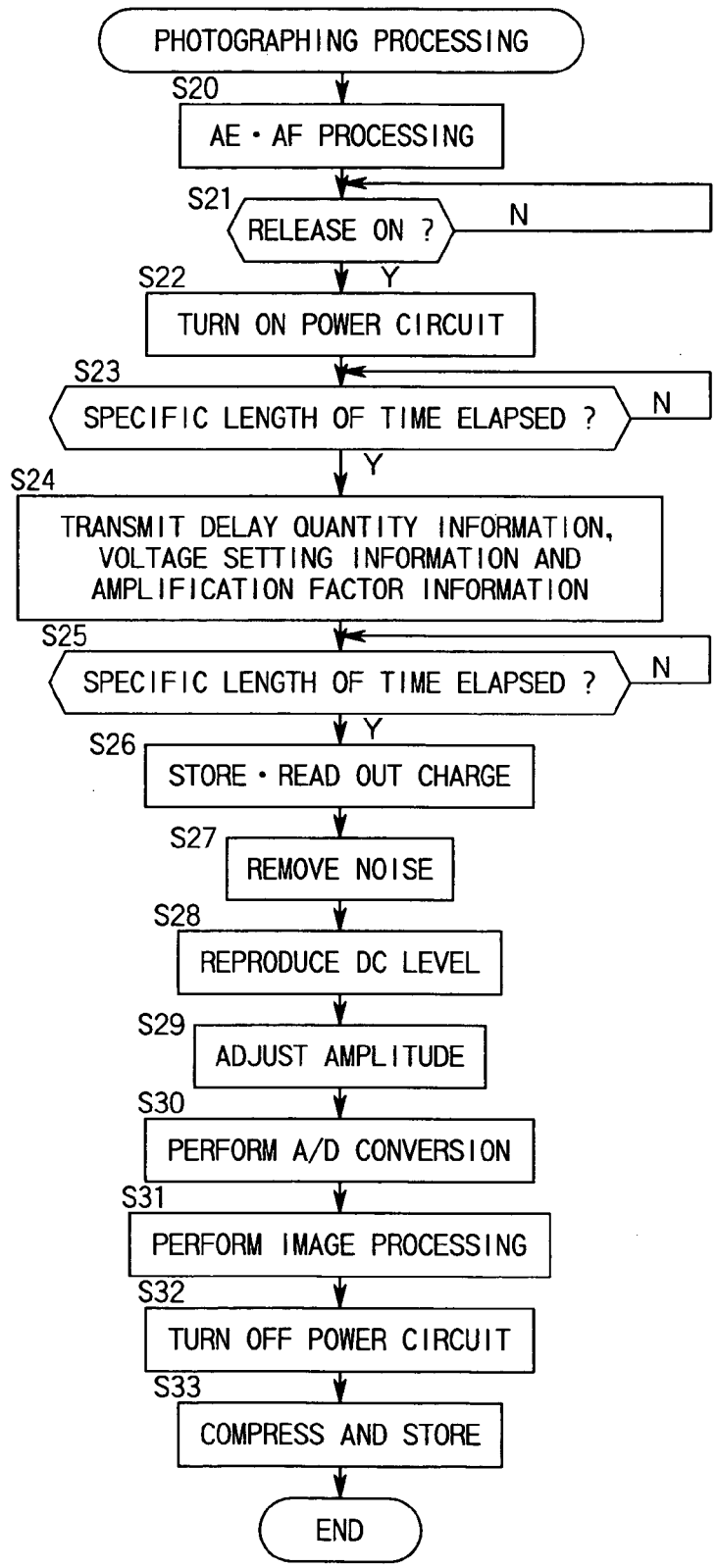
FIG. 9 is a flowchart of the photographing processing started up by pressing down a halfway press switch.

The photographing operation performed in the digital still camera 1 described above is explained. FIG. 9 is a flowchart of a program activated through the halfway press switch. When the halfway press switch 22 in FIG. 3 is operated, an exposure calculation is performed by measuring the brightness of the subject with the photometering device 37 and the focal adjustment state is detected with the focal point detection device 38 in step S20. If it is decided in step S21 that the shutter release switch 23 has been operated, the main CPU 21 turns on the power circuit 40 (see FIG. 4). If it is decided in step S23 that a specific length of time required for the operation of the power circuit 40 to become stabilized has elapsed, the operation proceeds to step S24, in which the delay quantity information stored within the register of the main CPU 21 is read out and the delay quantities thus read out are converted into a serial signal string to be transmitted to the delay circuit 24c through the control terminal, as explained earlier. In addition, the voltage setting information for the DC reproduction circuit 27b and the amplification factor information for the variable amplifier circuit 27c both stored in the register of the main CPU 21 are read out and transmitted to the respective circuits 27b and 27c through the control terminal. The delay quantity information, the voltage setting information and the amplification factor information stored in the register at the main CPU 21 are stored during the adjustment of the digital camera 1, and it can be updated by utilizing an external adjustment device.

If it is decided in step S25 that a specific length of time required by the delay circuit 24c to perform a timing adjustment has elapsed, the operation proceeds to step S26 to start a photographing sequence. In step S26, each of the pixels at the image-capturing element 26 stores a light-receiving signal, and when the storage process is completed, the charges stored at all the pixels are sequentially read out. In step S27, low frequency noise in the image signal thus read out is removed at the noise removal circuit 27a before the operation proceeds to step S28, in which the DC reproduction circuit 27b adjusts the signal level corresponding to a light-blocked pixel to a specific level. In step S29, the amplitude level of the image signal is adjusted to a specific amplitude at the variable amplifier circuit 27c, and in step S30, the image signal is converted to a digital image signal at the A/D conversion circuit 28.

In step S31, the digital image signal undergoes a gain adjustment processing, gamma gradation correction processing and JPEG format processing and the like at the image processing CPU 29. When the image processing is completed, the operation proceeds to step S32 to temporarily store the image data having undergone the image processing in the buffer memory 30 and turn off the power circuit 40. In step S33, the image data are read from the buffer memory 30, the data are compressed at the JPEG compression circuit 32 and the compressed image data are stored in the PC card 34. The sequence of the photographing operation thus ends.

The features of the first embodiment are summarized.

(1) Since the information indicating the delay quantity for each drive signal is set by the main CPU 21 at the delay circuit 24c that delays the individual drive signals used to drive the circuits of the image-capturing unit 100 and the drive signals are delayed in conformance to the delay quantity information by using a digital delay line, the delay quantities for the various drive signals can be adjusted simply by modifying the information on the delay quantities to be set at the delay circuit 24c without having to modify the circuit even when a component used in a circuit of the image-capturing unit 100 is changed and the timing of the image-capturing operation needs to be changed.

(2) Since a control signal provided by the main CPU 21 through the control terminal is used to turn on/off the output of the power circuit 40 which supplies source voltages to the various circuits of the image-capturing unit 100 and the power supply to the individual circuits is turned on/off by operating the shutter release switch 23, the power consumption in the digital still camera 1 is reduced to lengthen the service life of the battery 39.

(3) When the shutter release switch 23 is operated, the main CPU 21 sets information indicating a specific amplification factor for the variable amplifier circuit 27c, and the variable amplifier circuit 27c amplifies an image signal to achieve a specific amplitude based upon the amplification factor information. Thus, the image signal can be amplified based upon information indicating a new amplification factor set for the most recent photographing operation. Consequently, even when the quantity of light entering the image-capturing element 26 changes due to a change in the aperture value and the amplitude of the image signal changes, the amplitude of the image signal input to the A/D conversion circuit 28 is sustained at an optimal value at all times, to achieve a high-quality image.

While a digital delay line is used as a method for achieving delays in the explanation given above, delays may be effected through a combination of logic circuits instead of the use of the digital delay line. For instance, by employing a counter, signals can be output after a specific length of time is up.

Second Embodiment

Under normal circumstances, the propagation delay occurring inside a circuit is affected by the operating temperature at the circuit. For this reason, when the operating temperatures of the horizontal drive circuit 25a and the vertical drive circuit 25b in FIG. 4 fluctuate, phase delay changes attributable to the changes in the operating temperatures at the two drive circuits manifest in the individual drive circuits used to drive the image-capturing element 26. When the drive signals manifesting such phase delay changes are input to the image-capturing element 26, the timing with which the image signal is output from the image-capturing element 26 is also affected. In addition, the timing with which a drive signal is input to the image-capturing element 26 and data are output as the image-capturing element output, too, changes in correspondence to the operating temperature.

In the second embodiment, a temperature sensor 42 (see FIG. 4) is provided in the vicinity of the circuits constituting the image-capturing unit 100 in the digital camera 1, either by itself or in combination with the structural features of the first embodiment. In addition, information indicating delay quantities that will achieve optimal timing for the individual waveforms in FIGS. 7A~7F is prepared in advance in correspondence to individual temperatures to be detected by the temperature sensor 42 to be stored as a table using the detected temperatures as parameters in the register within the main CPU 21. Voltage setting information for the DC reproduction circuit 27b to be stored in the register of the main CPU 21 is prepared as specific sets of information corresponding to individual temperatures detected by the temperature sensor 42 and these sets of information are stored as a table using the detected temperatures as parameters in the register in the main CPU 21.

When the main CPU 21 reads out delay quantity information stored in the register, the delay quantity information corresponding to the temperature detected by the temperature sensor 42 is read out from the table in the register, and the delay quantity thus read out is converted into a serial signal string to be transmitted to the delay circuit 24c through the control terminal of the main CPU 21. FIG. 10 presents a table showing an example of the correspondence between the detected temperature and the delay quantity information. In FIG. 10, if the temperature detected by the temperature sensor 42 changes from +8° C. to +25° C., for instance, the delay quantity setting is changed from 2 nsec to 4 nsec by switching the serial signal string for ØH1 from (0010) to (0100). If the timing of the drive signal ØH1 advances by 2 nsec when the detected temperature changes from +8° C. to +25° C., the change in the timing of the drive signal is canceled out by increasing the delay quantity for the drive signal ØH1 from 2 nsec to 4 nsec. By setting delay quantity information that likewise corresponds to the detected temperature for the other drive signals, the timing of the circuit operation at the image-capturing unit 100 can be sustained in an optimal state.

In addition, the main CPU 21 reads out voltage settling information for the DC reproduction circuit 27b stored in the register by reading out the information corresponding to the temperature detected by the temperature sensor 42 from the table in the register, and it then transmits the information thus read out to the DC reproduction circuit 24b through the control terminal of the main CPU 21.

The features of the second embodiment are summarized below.

(1) The temperature sensor 42 is provided in the vicinity of the circuits constituting the image-capturing unit 100, the delay quantity information for the delay circuit 24c is stored in the register internally provided at the main CPU 21 as a table using the temperatures detected by the temperature sensor 42 as parameters and the delay quantity information corresponding to the detected temperature is read out when the shutter release switch 23 is operated. Thus, the individual drive signals for the image-capturing unit 100 can be delayed in conformance to the delay quantity information corresponding to the temperature detected at the time of photographing. As a result, even when the timing of the image-capturing operation performed at the circuits constituting the imagecapturing unit 100 changes due to a change in the temperature, the timing of the image-capturing operation is sustained in an optimal state at all times to achieve a high-quality image.

(2) The voltage setting information for the DC reproduction circuit 24b is stored at the register internally provided in the main CPU 21 as a table using the temperatures detected by the temperature sensor 42 as parameters, and when the shutter release switch 23 is operated, the voltage setting information corresponding to the detected temperature is read out to be transmitted to the DC reproduction circuit 27b. Thus, even when the output voltage from the DC reproduction circuit 27b fluctuates due to a change in the temperature, the image signal reference voltage is sustained at an optimal value at all times to achieve a high-quality image.

Third Embodiment

Under normal circumstances, the propagation delay occurring inside a circuit is affected by the operating voltage at the circuit. For this reason, when the source voltages VC, VA and VB supplied to the horizontal drive circuit 25a and the vertical drive circuit 25b in FIG. 4 fluctuate, phase delay changes attributable to the changes in the source voltages occur in the individual drive signals that are output from the two drive circuits to drive the image-capturing element 26. When the drive signals manifesting such phase delay changes are input to the image-capturing element 26, the timing with which the image signal is output from the image-capturing element 26 is also affected. In addition, the timing with which the drive signal is input to the image-capturing element 26 and data are output as the image-capturing element output, too, changes in correspondence to the source voltages VA and VB supplied to the image-capturing element 26.

In the third embodiment, a voltage sensor 43 (see FIG. 4) is provided to detect the terminal voltage at the battery 39 in the digital camera 1 either by itself or in combination with the structural features of the first or second embodiment. In addition, information indicating delay quantities that will achieve optimal timing for the individual waveforms in FIGS. 7A~7F is prepared in advance in correspondence to voltages detected by the voltage sensor 43 that detects the terminal voltage of the battery 39 to be stored as a table using the detected voltages as parameters in the register within the main CPU 21.

When the main CPU 21 reads out delay quantity information stored in the register, the delay quantity information corresponding to the voltage detected by the voltage sensor 43 is read out from the table in the register, and the delay quantities thus read out are converted into a serial signal string to be transmitted to the delay circuit 24c through the control terminal of the main CPU 21. FIG. 11 presents a table showing an example of the correspondence between the detected voltage and the delay quantity information. In FIG. 11, if the voltage detected by the voltage sensor 43 changes from a level equal to or higher than V1 to a level equal to or higher than V2 and lower than V1, for instance, the delay quantity setting is changed from 3 nsec to 4 nsec by switching the serial signal string for ØH2 from (0011) to (0100). If the timing of the drive signal ØH2 advances by 1 nsec, when the detected voltage changes from a level equal to or higher than V1 to a level equal to or higher than V2 and lower than V1, the change in the timing of the drive signal is canceled out by increasing the delay quantity for the drive signal ØH2 from 3 nsec to 4 nsec. By setting delay quantity information that likewise corresponds to the detected voltage for the other drive signals, the timing of the circuit operation at the image-capturing unit 100 can be sustained in an optimal state.

The feature of the third embodiment is now summarized. The voltage sensor 43 that detects the terminal voltage of the battery 39 is provided, delay quantity information for the delay circuit 24c is stored at the register internally provided at the main CPU 21 as a table using the voltages detected by the voltage sensor 43 as parameters and the delay quantity information is read out in correspondence to the battery voltage detected at the time of photographing. As a result, the individual drive signals can be delayed in conformance to the delay quantity information corresponding to the terminal voltage of the battery 39 at the time of photographing, and even when the timing of the image-capturing operation at the circuits constituting the image-capturing unit 100 changes due to a change in the voltage of the battery 39, the timing of the image-capturing operation is sustained in an optimal state at all times to achieve a high-quality image. Since a battery-operated instrument is usually provided with a voltage detection circuit that detects the terminal voltage of the battery to enable display of the remaining battery power or a low battery warning, it is not necessary to provide a special voltage sensor to implement the embodiment, and thus, any increase in the cost can be minimized.

While an explanation is given above on an example in which the terminal voltage of the battery 39 provided inside the digital still camera 1 is detected, a source voltage supplied from the outside to the digital still camera 1 may be detected to set the delay quantity information in correspondence to the detected voltage if the digital still camera 1 operates on power supplied from the outside. In addition, the source voltages VA~VE supplied to the individual circuits may be detected, instead.

Fourth Embodiment

The propagation delay occurring in a circuit may change in correspondence to a change in the duration of operation (the duration of utilization) of the circuit. If phase delay changes occur in the individual drive signals output from the horizontal drive circuit 25a and the vertical drive circuit 25b in FIG. 4 to drive the image-capturing element 26, due to changes in the operating durations of the two circuits, the drive signals manifesting such phase delay changes are input to the image-capturing element 26, causing a change in the timing with which the image signal is output from the image-capturing element 26. In addition, the timing with which the drive signals are input to the image-capturing element 26 and data are output as the image-capturing element output may be affected by the operating duration of the image-capturing element 26 as well.

In the fourth embodiment, a photo number counter that counts the total number of photos taken on the digital still camera 1 is provided at the register in the main CPU 21 by itself, in combination with the structural features of one of the first~third embodiments or in an appropriate combination with more than one of the first~third embodiments. The total number of photos in this context refers to the total number of photos that have been taken since the initial operation of the digital camera 1. Information indicating delay quantities that achieve an optimal state for the timing of each of the waveforms in FIGS. 7A~7F is prepared in advance in correspondence to individual ranges of the total number of photos counted by the photo number counter and is stored as a table using the total numbers of photos as parameters in the register at the main CPU 21, independent of the photo number counter.

When the main CPU 21 reads out delay quantity information stored in the register, the delay quantity information corresponding to the total number of photos that have been counted is read out from the table in the register, and the delay quantities thus read out are converted into a serial signal string to be transmitted to the delay circuit 24c through the control terminal of the main CPU 21. FIG. 12 presents a table showing an example of the correspondence between the total number of photos and the delay quantity information. In FIG. 12, if the total number of photos counted on the photo number counter exceeds 10,000, for instance, the delay quantity setting is changed from 1 nsec to 2 nsec by switching the serial signal string for ØRG from (0001) to (0010). If the timing of the drive signal ØRG advances by 1 nsec, when the total number of photos reaches 10,000, the change in the timing of the drive signal is canceled out by increasing the delay quantity for the drive signal ØRG from 1 nsec to 2 nsec. By setting delay information that likewise corresponds to the total number of photos for the other drive signals, the timing of the circuit operation at the image-capturing unit 100 can be sustained in an optimal state.

The feature of the fourth embodiment is summarized. The photo number counter that counts the total number of photos taken on the digital camera 1 is provided, delay quantity information for the delay circuit 24c is stored at the register internally provided at the main CPU 21 as a table using the total number of photos counted by the counter as parameters and the delay quantity information is read out in correspondence to the total number of photos at the time of photographing. As a result, the individual drive signals can be delayed in conformance to the delay quantity information corresponding to the total number of photos at the time of the photographing operation, and the image-capturing operation can always be performed with optimal timing in correspondence to the total number of photos taken, even when the timing of the image-capturing operation at the circuits constituting the image-capturing unit 100 changes due to change in the durations of operations (utilization) of the circuits, to achieve a high-quality image.

While the delay quantity information is read out in correspondence to the total number of photos in the explanation given above, delay quantity information may be read out in correspondence to the total length of time over which the digital camera 1 has been used instead of the number of photos. In such a case, a total time counter that counts the accumulated length of time over which power to the digital camera 1 has been turned on should be provided, with delay quantity information for the delay circuit 24c stored as a table using the accumulated length of time counted by the total time counter as parameters in the register at the main CPU 21 so that the delay quantity information is read out in correspondence to the accumulated length of time at the time of photographing.

The control bits in the delay quantity information table mentioned above are set in advance as delay quantity information based upon calculated values of delays for the individual drive signals used to drive the circuits at the image-capturing unit 100 or based upon measured values, and are stored in a register managed by the main CPU 21. When combining the first~fourth embodiments explained above, the main CPU 21 determines the appropriate delay quantity information for the delay circuit 24c by combining the delay quantity information in the individual tables.

While an explanation is given above on an example in which the present invention is adopted in a digital still camera which does not allow lens exchange, it may be also adopted in a single lens reflex digital still camera or a digital video camera that is capable of taking in dynamic images. In a single lens reflex digital still camera, a mechanical shutter may be provided in front of the image-capturing element 26 so that power to the image-capturing element 26 is turned on when the shutter release switch 23 is operated to control the exposure operation by controlling the length of time over which the mechanical shutter remains open. The present invention maybe adopted in such a single lens reflex digital still camera to optimize the operating timing of the power circuit 40, the operating timing of the mechanical shutter and the operating timing of the image-capturing element 26 through the delay circuit 24c.

In addition, the present invention may be adopted in facsimile machines, scanners, photocopiers and the like that employ an image-capturing element. In other words, the present invention may be adopted in all types of apparatuses that employ an image-capturing element.

Furthermore, an explanation is given above in reference to the first embodiment on an example in which the delay quantity information stored within the register at the main CPU 21 is read out for each photographing operation and the delay quantities thus read out are provided to the delay circuit 24c. However, if it is not necessary to set delay quantities for each photographing operation, a nonvolatile memory or a register may be provided within the delay circuit 24c so that the delay quantities obtained through testing conducted before factory shipment are first set in the nonvolatile memory or the like in the delay circuit 24c and the values thus set may be used for subsequent operations.

While an explanation is given above in reference to the second embodiment on an example in which the temperature sensor 42 is provided near the circuits constituting the image-capturing unit 100 in the digital camera 1, the present invention is not limited to this example. The temperature at another location that affects the timing of the image-capturing operation may be detected, instead.

While examples in which the image-capturing operation timing is adjusted by detecting the temperature and the terminal voltage in reference to the second and third embodiments, the present invention is not limited to these examples. The present invention may be implemented by detecting a factor other than the temperature or the terminal voltage that affects the image-capturing operation timing.

Moreover, the entirety or part of the analog signal processing circuit 27, the driver 25 and the timing control circuit 24 may be provided on a single chip.

What is claimed is:

1. A digital camera comprising:
   an image-capturing device that captures a subject image through a taking lens;
   a signal processing circuit that performs predetermined processing on an image-capturing signal output by said image-capturing device;
   a drive circuit that enables said image-capturing device to operate;
   a delay device that outputs a signal achieved by applying a predetermined delay to a drive signal used to drive said image-capturing device and said signal processing circuit;
   a control device that sets a delay time for said delay device; and
   a voltage detection device that detects a source voltage supplied to said image-capturing device, said signal processing circuit and said drive circuit, wherein
   said control device sets said delay time for said delay device in correspondence to the voltage detected by said voltage detection device.

2. A digital camera according to claim 1, wherein said signal processing circuit includes a correlated double sampling circuit (CDS).

3. An image-capturing control apparatus comprising:
   a signal processing device that performs predetermined processing on an image-capturing signal obtained through photoelectric conversion performed at an image-capturing device and output by said image-capturing device;
   a drive signal generating device that generates a drive signal used to drive said image-capturing device and said signal processing device;
   a delay device that delays said drive signals in conformance to a delay control signal; and
   a control device that outputs said delay control signal to said delay device so as to adjust operating timing of said drive signal to a predetermined operating timing, wherein;
   said control device detects an environment condition that disrupts said predetermined operating timing and outputs said delay control signal in correspondence to the detected environment condition; and
   said environment condition is an environment condition changed by a voltage that affects the timing with which said image-capturing signal is output.

4. A digital camera according to claim 1, wherein:
   said control device sets the delay time for said delay device for each photographing operation.

5. A digital camera according to claim 3, wherein:
   said control device sets the delay time for said delay device for each photographing operation.

6. A digital camera according to claim 1, wherein the predetermined processing comprises noise removal.

7. A digital camera according to claim 3, wherein the predetermined processing comprises noise removal.

* * * * *